(No Model.)

G. D. BURTON.
ELECTROLYTIC HEATING APPARATUS.

No. 587,568. Patented Aug. 3, 1897.

Witnesses:
John Enne
R. W. Bishop

Inventor
George D. Burton
by Chas. E. Barber
Attorney

UNITED STATES PATENT OFFICE.

GEORGE D. BURTON, OF BOSTON, MASSACHUSETTS.

ELECTROLYTIC HEATING APPARATUS.

SPECIFICATION forming part of Letters Patent No. 587,568, dated August 3, 1897.

Application filed February 24, 1897. Serial No. 624,850. (No model.)

*To all whom it may concern:*

Be it known that I, GEORGE D. BURTON, a citizen of the United States, residing at Boston, in the county of Suffolk and State of Massachusetts, have invented certain new and useful Improvements in Soldering-Iron Heaters, of which the following is so full, clear, and exact a description as will enable others skilled in the art to which my invention appertains to make and use the same, reference being had to the accompanying drawings, in which—

Figure 1:
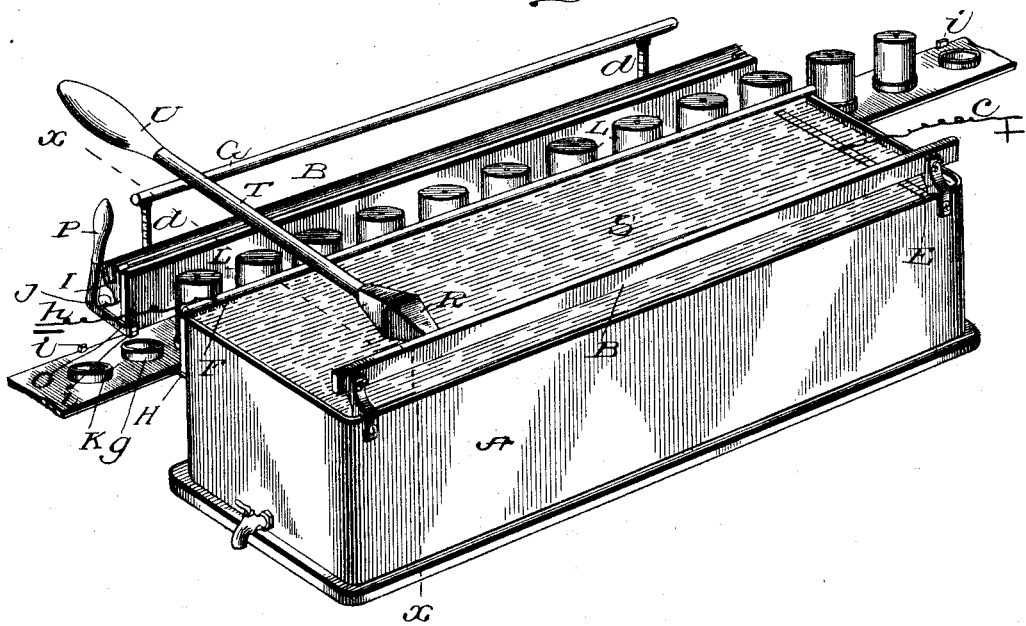
Figure 2:
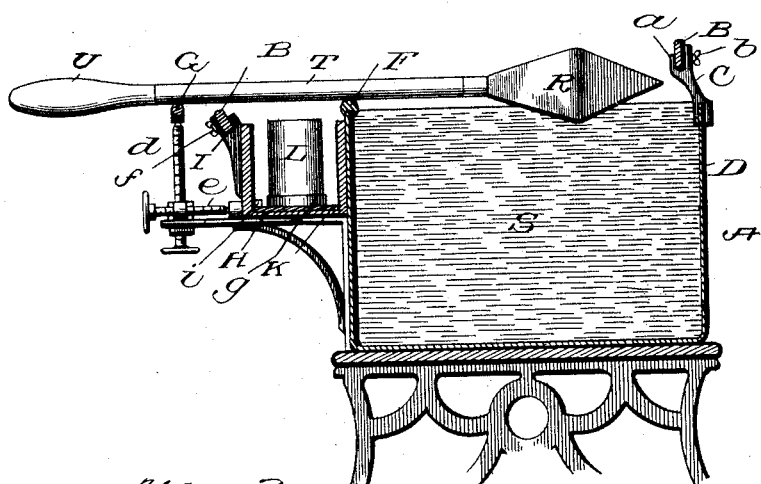
Figure 3:
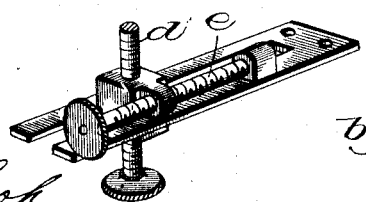

Figure 1 is a perspective view of my improved soldering apparatus. Fig. 2 is a section taken on the line $x\,x$ of Fig. 1. Fig. 3 is a perspective view of a bracket and the adjustable support.

The object of my invention is to provide a soldering-iron heater and soldering apparatus by the use of which corroding of the soldering-point of the copper will be avoided, the heating of the same will be uniform and continuous, the solder will be in position for quick and convenient use, the heat from the heating agent will be reduced to a minimum in the room occupied by the operator or operators, and the articles to be soldered will be fed automatically to the artisan who is doing the work, and the menial labor of handling the articles to be soldered may be performed by unskilled laborers, thus saving cost of material in the copper, which by the present mode of use will become corroded and must be repeatedly filed or ground to keep its surface uncoated, so that the solder will stick to it. This wears the copper away, causing a useless waste. It takes valuable time and must be done by an expert. I also avoid the necessity of constantly retinning the copper, which of itself is an important item. I also save waste of solder in that I avoid the constant dropping of drops of solder from the copper, which always results from the corrosion of the copper. Furthermore, all solder (when held for use, as shown in Fig. 2) which is inadvertently precipitated into the tank by careless or hasty "wiping" will be found in the bottom of the tank in solid and untainted globules of solder, and they may readily be washed and remolded into bars for use.

In the accompanying drawings, A designates a tank which is filled with an electrolytic liquid solution of proper conductivity.

In Fig. 2 I show the bar of solder B secured to a bracket C by means of a projection $a$ and a thumb-screw $b$ at what I shall call the "front" edge D of the tank. In one end of the tank I place a plate E, which is of proper conductivity and which is connected electrically with the positive pole of the electrical generator by the conductor $c$. This plate E extends down into the tank and is in contact with the electrolytic solution S in the tank. A bar or rest F of proper conductivity is placed at the rear edge of the tank A, and it is supported by the edge of the tank, or it may be supported by any other suitable device or devices. If the tank is made of metal, it should be insulated from the bar F. This bar is connected electrically with the negative pole by the conductor $h$. A second bar or rest G is secured to back of the bar or rest F and practically parallel thereto. This forms a rest for the shank of the soldering-iron, and it is adjustable vertically by means of screws $d\,d$ and horizontally by means of screws $e\,e$.

A shelf H is provided at the rear side of the tank A and is provided with a receptacle or groove I for the soldering-bar B and is also provided with screws $f\,f$ for clamping the bar into fixed position. An endless apron K is fed in any suitable manner along the upper side of the shelf H, and it may or may not be provided with recesses $g\,g$ for cans L L, which are shown in position to be soldered.

The operator will be guided in the selection of the belt by the character of the articles which he desires to solder. The belt may be provided with stops $i\,i$, adapted to be engaged by a catch O, pivoted at $j$ and provided with a handle P. This is shown as one means of stopping the belt and as a means of permitting it to move at will. It will be understood that the belt is under constant strain, being duly connected with devices and power to cause it to move either one way or the other. The catch and stops will be operative no matter which way the belt is moving. Any equivalent means may be employed for moving the belt and for causing it to stop and start at the will of the operator. The "copper" is designated by the letter R and is secured to the shank T, which is in turn provided with the usual handle U. The details of construction and arrangement may be changed at will without departing from the spirit of my invention and without in any way interfering with its usefulness. I therefore wish to be understood as not limiting myself to the exact construction shown and described.

The operation is as follows: The soldering-iron is placed in position shown with its shank contacting electrically with the bar F. The copper R is permitted to sink a proper distance into the liquid in the tank, and the depth to which it sinks is determined and then adjusted by means of the screws $d\ d$. The current is then switched on and the copper heated to the proper temperature for melting the solder by simply wiping the bar B with the point of the copper. The articles to be soldered are placed on the belt or apron K, motion is imparted to this apron as the articles are soldered and ready to leave the soldering-machine, and they are carried forward by the belt bringing up other articles to be soldered which have been previously placed upon the belt, so that the completed articles may be taken away and other articles to be soldered added on indefinitely.

The negative pole may be connected electrically with the bar G instead of the bar F. This will avoid danger of contacting of this pole with the solution in the tank.

Having described the objects, uses, and advantages of my device, what I desire to secure by Letters Patent of the United States, and what I therefore claim, is—

1. An improved soldering apparatus, consisting of a tank provided with an electrode adapted to contact with the contents of the tank; in combination with a second electrode, adjacent to said tank, an adjustable rest adjacent to said second electrode, substantially as described.

2. An improved soldering apparatus consisting of a tank provided with an electrode adapted to contact with the contents of the tank; in combination with a second electrode, adjacent to said tank, a rest adjacent to said second electrode and a solder-holder, substantially as described.

3. An improved soldering apparatus consisting of a tank provided with an electrode adapted to contact with the contents of the tank; in combination with a second electrode adjacent to said tank, a vertically-adjustable rest adjacent to said second electrode and a solder-holder, substantially as described.

4. An improved soldering apparatus consisting of a tank provided with an electrode adapted to contact with the contents of the tank; in combination with a second electrode adjacent to said tank, a horizontally-adjustable rest adjacent to said second electrode, substantially as described.

5. An improved soldering apparatus consisting of a tank provided with an electrode adapted to contact with the contents of the tank; in combination with a second electrode adjacent to said tank, a horizontally and vertically adjustable rest adjacent to said second electrode, substantially as described.

6. An improved soldering apparatus consisting of a tank provided with an electrode adapted to contact with the contents of the tank; in combination with a second electrode adjacent to said tank, a rest adjacent to said second electrode and a shelf for supporting the articles or article to be soldered substantially as described.

7. An improved soldering apparatus consisting of a tank provided with an electrode adapted to contact with the contents of the tank; in combination with a second electrode adjacent to said tank, a rest adjacent to said second electrode and a shelf for supporting the article or articles to be soldered, located at the rear of the tank, substantially as described.

8. An improved soldering apparatus consisting of a tank provided with an electrode adapted to contact with the contents of the tank; in combination with a second electrode adjacent to said tank, a rest adjacent to said second electrode and a shelf carrying a movable apron, for supporting the article or articles to be soldered, substantially as described.

9. An improved soldering apparatus consisting of a tank provided with an electrode adapted to contact with the contents of the tank; in combination with a second electrode adjacent to said tank, a rest adjacent to said second electrode and a shelf carrying an endless movable apron for supporting the article or articles to be soldered, substantially as described.

10. An improved soldering apparatus consisting of a tank provided with an electrode adapted to contact with the contents of the tank; in combination with a second electrode adjacent to said tank, an adjustable rest adjacent to said second electrode and a support for the solder which support is adapted to hold the solder over the tank and in position to permit the tank to catch dripping of solder from the copper, substantially as described.

11. An improved soldering apparatus consisting of a tank provided with an electrode adapted to contact with the contents of the tank; in combination with a second electrode adjacent to said tank, a rest adjacent to said second electrode and a shelf carrying a movable apron, for supporting the article or articles to be soldered, and means for holding and releasing the apron to stop its movement and to permit it to move at will, substantially as described.

12. An improved soldering apparatus consisting of a tank provided with an electrode adapted to contact with the contents of the tank; in combination with a second electrode adjacent to said tank, an adjustable rest adjacent to said second electrode and a solder-holder provided with means for clamping the solder, substantially as described.

In testimony whereof I affix my signature in the presence of two witnesses.

GEO. D. BURTON.

Witnesses:
ALEX. S. STEUART,
CHAS. E. BARBER.